Nov. 9, 1948.   L. D. STATHAM ET AL   2,453,601
ELECTRIC STRAIN GAUGE
Filed Sept. 21, 1944
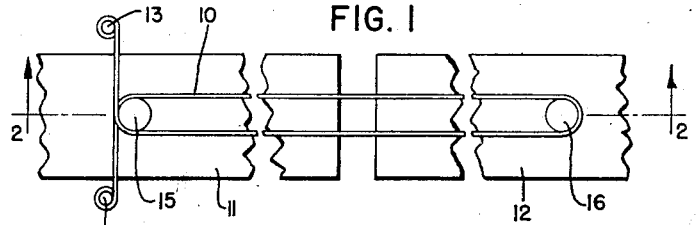
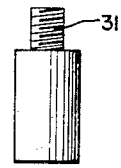
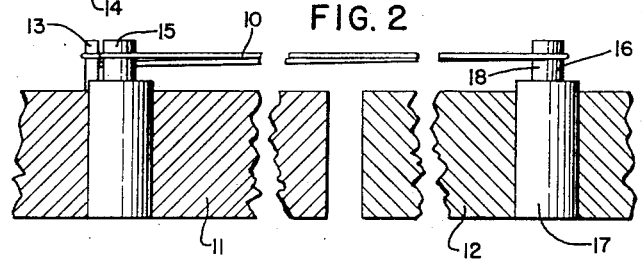
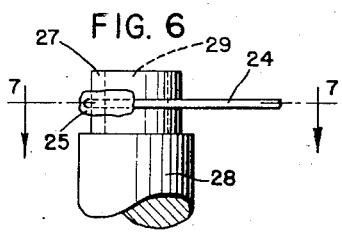
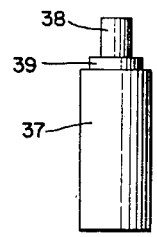
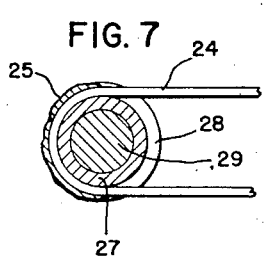
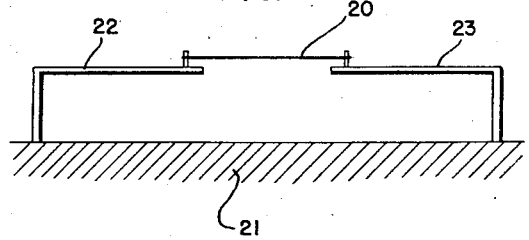
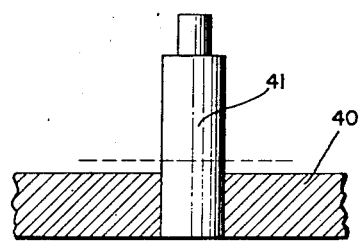
INVENTOR.
LOUIS D. STATHAM
KARL D. SWARTZEL
BY CARLOS J. BAKER
ATTORNEY Patented Nov. 9, 1948

2,453,601

UNITED STATES PATENT OFFICE 2,453,601

ELECTRIC STRAIN GAUGE

Louis D. Statham and Carlos J. Baker, Los Angeles, Calif., and Karl D. Swartzel, Snyder, N. Y., assignors to Curtiss-Wright Corporation, a corporation of Delaware Application September 21, 1944, Serial No. 555,168

14 Claims. (Cl. 201—63)

This invention relates to the measurement of quantities, such as structural strains. More particularly, it relates to the measurement of quantities as a function of the variation in length and therefore the variation in electrical resistance of a wire of known electrical characteristics.

In U. S. patent to Simmons, No. 2,292,549, there is described a gauge element, known as a strain gauge, consisting simply of a length of wire of known specific resistance, whose length is caused to vary as the result of change of length of the structure to which it is attached. The length of wire is attached throughout its length to the structural member by means of a suitable adhesive, such as "Duco" household cement. For most applications, particularly where the gauge is attached to a metallic structural member, an insulating member such as of thin paper or organic plastic materials must be interposed between the gauge and the structural member. This mounting arrangement has several disadvantages, probably the most important being that it is only applicable to circumstances where the strain gauge is attached to a single member, and not applicable to circumstances where it is desired to measure the relative movement between two members. Another disadvantage is that strain gauges so mounted are subject to creep, cold flow, deterioration with age, and temperature and humidity effects.

It is therefore an object of this invention to provide an improved method and means for mounting wire resistance type strain gauges. Another object is to provide such a method and means which will eliminate the necessity for the use of adhesive. A further object is to provide such a method and means which will not deteriorate with age and will not be subject to creep, cold flow, and temperature and humidity effects. A still further object to to provide such a method and means which will permit a greater change in length in the strain wire than in the member to which it is attached, and thus provide a simple method and means for amplification of strains. Other objects will appear hereinafter.

These objects are accomplished by means of the herein described invention, which may be more readily understood by reference to the accompanying drawings, in which: Figure 1 is a plan view of a strain wire mounted in accordance with the present invention connected to two separate base members. Figure 2 is a view taken along the line 2—2 of Figure 1. Figures 3, 4 and 5 are side views of three different forms of pins which may be employed in the construction shown in Figures 1 and 2. Figure 6 is a view, corresponding to Figures 3, 4 and 5, of a modified form of construction. Figure 7 is a section taken along the line 7—7 of Figure 6. Figure 8 is a view, corresponding to Figure 2, of still another modified form of construction. Figure 9 is a view illustrating a method of preparing the pins for use.

Referring now to Figures 1 and 2, a strain wire 10 is shown mounted so as to indicate relative movement between two base members 11 and 12. Instead of indicating relative movement between two separate base members, it may equally well indicate change in length in a single base member. In either case one end of the strain wire 10 is firmly attached, such as by soldering, to a fixed electrical terminal 13. The wire is then successively wound around two pins 15 and 16, described hereinafter, at a predetermined tension, and the opposite end of the wire firmly attached, such as by soldering, to a second fixed electrical terminal 14. Instead of taking only a single loop around the two pins 15 and 16, the wire 10 may be sufficiently long as to take two or more turns around the pins, passing alternately around one pin and then the other pin. By this means a greater total length change (but not a greater percentage length change) in the strain wire is obtained with a given relative movement between the pins 15 and 16 than with a single turn.

In Figure 8 is shown a modification employing Z-shaped pins 22 and 23 attached to a base 21. In this case the distance $L_1$ between the points of attachment of the pins 22 and 23 to the base 21 is considerably greater than the distance $L_2$ between the points on the pins where the strain wire 20 is attached. By this means not only a greater total length change but also a greater percentage length change in the strain wire is obtained with a given relative movement between the pins 22 and 23 than in the structure shown in Figures 1 and 2. This arrangement enables true strain amplification to be secured, the degree of amplification being the length $L_1$ divided by the length $L_2$. This arrangement is particularly desirable where the strains encountered are extremely small and where high accuracy is required.

In the measurement of strains or other quantities varying at high frequencies, or where an accurate time record of the quantities is desired, it has been observed that the resistance of the strain wire exhibits a certain amount of hysteresis, when mounted as shown in Figures 1 and 2. The degree of hysteresis has been found to be as much as 1% or more. It has been found that this hysteresis may be substantially completely overcome by soldering the strain wire to a brass or similar metallic collar slipped over the projecting part of the pin. This construction prevents slippage between the strain wire and the pin, and is shown in Figures 6 and 7 of the drawings. The brass collar 27 is first slipped over the projecting part 29 of the pin 28. The strain wire 24 is then wound around the pin 28 as heretofore described, and the solder 26 applied to firmly cement the wire 24 to the collar 27. The collar is slipped over the pin relatively loosely, in order to avoid damage to the insulation on the surface of the pin, as hereinafter described. Despite the looseness of this fit, hysteresis does not occur when the solder 26 forms a firm union between the wire and the pin. When insulation is not applied to the surface of the pin a relatively tight fit may be employed.

The structure of the pins upon which the strain wire is mounted is an important feature of the present invention. Because of the size of the base members 11 and 12 or the general nature of the structure, it is not always feasible to insulate the members 11 and 12 from each other or from the terminals 13 and 14. In the case of a single base member it is of course impossible to employ this expedient. Inasmuch as the greatest application of strain gages is in connection with base members of conducting metal, it is evident that the question of insulation is of especial importance. In the structure according to U. S. Patent 2,292,549 insulation is obtained by interposing a paper or similar strip between the strain wire and the base. According to the present invention, the insulation may be embodied in the supporting pins. In order to avoid distortion, deterioration with age and impairment of accuracy by reason of temperature and humidity effects, these pins are constructed out of metal. Insulation between the metal base of the pin and the strain wire is incorporated by providing aluminum pins with an anodized coating. Such a coating consists of a thin layer of aluminum oxide formed by electrolytic means, and is extremely hard, tough and adherent. The coating is obtainable in all colors, black and colorless, black being preferred because it requires the maximum thickness (about 0.0003 inch).

Despite the thinness of this film or coating, it has shown excellent insulating qualities for the purpose. Its resistance was measured by connecting one terminal of a commercial high range ohmmeter to the strain wire and the other terminal to the base. The strain wire was wound around 20 anodized pins embedded in the base. With the ohmmeter connected to the 20 megohm scale, which applied approximately 90 volts across the anodized surface, no current flow was detected. In addition, the coating shows excellent resistance to high temperatures. In order to check this, the wire wrapped around the pin was thoroughly heated with a soldering iron. While this was being done, the pin as well as the wire was contacted for several seconds by a puddle of melted solder. This resulted in temperatures at least as high as would ever be encountered in soldering a strain wire to a brass collar slipped over the pin. The voltage was then applied between the wire and the pin and raised to 720 volts without the insulation breaking down. The voltage was left at this value for one-half hour without effect.

An alternative form of insulation (not shown) is to provide an insulating bushing, such as of "Bakelite" resins or similar material, between the pin and the base. In this case the strain wire may be soldered directly to the pin (which may be of brass or other conducting metal) to prevent hysteresis, or a brass collar slipped over the pin may fit relatively tightly.

Figures 2, 3, 4 and 5 show various specific forms of pins for use in the practice of the present invention. The form shown in Figure 2 is the simplest, and consists of a body portion 17 of such dimension that it may be pressed into the base member 11 and a projecting portion 18 of smaller diameter around which the strain wire is wound. The form shown in Figure 3 is similar, except that the projecting portion 31 is threaded, so that when several turns of wire are strung around the pin they are separated from each other. The form shown in Figure 4 is provided with a small shoulder 39 between the projection 38 and body 37, this shoulder serving to protect the anodizing on the projection from damage while the pin is being pressed into place. The form in Figure 5 has both a shoulder and a threaded projection.

In Figure 9 is shown the method of holding the pins during the anodizing process. The pins 41 are made somewhat longer than the finished product is to be, and pressed into holes in a piece of sheet aluminum 40. In this manner a large number of pins may be anodized at one time. After anodizing they are cut off as indicated by the broken line and trimmed down to the proper length.

The above discussion has been in connection with several specific forms of the invention. It is obvious, however, that many changes may be made therein without departing from the spirit of the invention. It is therefore understood that the invention is not to be limited except as defined in the appended claims.

We claim:

1. A mounting for strain wire whose electrical resistance varies with length and whose length varies reversibly with an applied load, comprising a metallic base member, a plurality of aluminum pins mounted in said base member, an anodized surface on each of said pins forming thereby an electrical insulating surface, a metallic collar loosely mounted on said pin and in contact only with said insulating surface, a pair of electrical terminals insulated from each other, each of said terminals being fixed in position with respect to one of said pins, and a strain wire attached at one end to one said terminal and at the other end to the other said terminal and wound successively around each of said pins under a predetermined tension and adhesively secured to said metallic collars thereon.

2. A mounting for strain wire whose electrical resistance varies with length and whose length varies reversibly with an applied load, comprising a pair of metallic base members, a plurality of aluminum pins one-half mounted in each said base member, an anodized surface on each of said pins forming thereby an electrical insulating surface, a metallic collar loosely mounted on said pin and in contact only with said insulating surface, a pair of electrical terminals insulated from each other, each of said terminals being fixed in position with respect to one of said pins, and a strain wire attached at one end to one said terminal and at the other end to the other said terminal and wound successively around each of said pins under a predetermined tension and soldered to said metallic collars thereon.

3. A mounting for strain wire whose electrical resistance varies with length and whose length varies reversibly with an applied load, comprising a metallic base member, a pair of metallic pins mounted in said base member in spaced apart relationship to each other, an extension on each of said pins extending inward towards the other of said pins, a sub-extension on the inward end of each of said extensions, a pair of electrical terminals insulated from each other, each of said terminals being fixed in position with respect to one of said pins, a strain wire attached at one end to one said terminal and at the other end to the other said terminal and wound successively around each of said sub-extensions under a predetermined tension, and insulation means between said strain wire and said base member.

4. In an electrical strain sensitive apparatus for a structure adapted to be variably strained, a pair of supports and a strain wire whose electrical resistance varies with linear extension and contraction thereof tensioned between said supports, each support having a first part for connection to the structure and a second part for connection with the strain wire, and at least one of said supports having the second part thereof offset from the first part thereof in the direction of the other support whereby the degree of variation in length of the structure between the points of connection thereto of the supports will effect an amplified degree of variation in the length of the strain wire.

5. In an electrical strain sensitive apparatus for an electrically conductive structure adapted to be variably strained, a pair of metallic supports and a strain wire whose electrical resistance varies with linear extension and contraction thereof tensioned between said supports, each support having a first part for connection to the structure and cylindrical second part for connection with the strain wire, at least one of said supports having the second part thereof offset from the first part thereof in the direction of the other support to amplify the degree of variation in length of the strain wire in response to variations in the length of the structure between the points of connection thereto of the first parts of the supports, a metallic collar extending about each of said second parts, the strain wire being extended about the collar and being soldered thereto, and the contacting surface portions of each collar and the related cylindrical part being electrically insulated.

6. In an electrical strain sensitive apparatus for a structure to be variably strained, a pair of supports for connection to said structure at spaced points and a strain wire whose electrical resistance varies with linear expansion and contraction thereof tensioned between said supports, at least one of said supports being metallic and having a cylindrical part, a collar mounted on said cylindrical part, the strain wire extending about said collar and being soldered thereto, and the contacting surface portions of the collar and cylindrical part being electrically insulated.

7. In an electrical strain sensitive apparatus, a tensioned strain wire and spaced supporting means therefor, one of said means comprising a supporting pin, a metallic collar mounted on said pin, and said strain wire extending about said collar and adhesively secured thereto.

8. In an electrical strain sensitive apparatus having spaced wire supporting means and a strain wire tensioned between them, at least one of said means comprising a metallic support having a substantially cylindrical part, a metallic collar mounted on said part, the contacting surface portions of the cylindrical part and said collar being electrically insulated, and the tensioned strain wire extending about said collar and adhesively secured thereto.

9. In an electrical strain sensitive apparatus having spaced wire supporting means for mounting on an electrically conductive structure and a strain wire tensioned between said spaced means, at least one of said means comprising a support for connection to said structure and provided with a cylindrical part, a metallic collar mounted on said part, the collar being electrically insulated from the structure, and the tensioned strain wire extending about said collar and adhesively secured thereto.

10. In an electrical strain sensitive apparatus having spaced wire supporting means and a strain wire tensioned between them, at least one of said supporting means comprising a metallic base part provided with a recess and a metallic pin having a first cylindrical portion driven into said recess for rigid connection with said base part, said pin having a second cylindrical portion of reduced diameter projecting from the first portion for supporting the strain wire and being grooved to seat in spaced relation plural turns of said wire, the surface of the pin being provided with insulation to electrically separate said turns of wire at the pin, and the surface of the pin between said first and second portions thereof comprising a shoulder for engagement in driving the pin into said recess without damage to said insulation.

11. In an electrical strain sensitive apparatus having a base structure with relatively movable portions whose movement is to be measured, a strain wire support carried by each portion and a strain wire wound successively around and extending in tension between said supports, at least one said base portion having a recess and the wire support thereon comprising an aluminum pin having an enlarged part fitted into said recess for rigid connection with said base portion, and said pin having a reduced part engaged by successive turns of said wire, said reduced part being grooved to support said successive turns in spaced relation and having its surface anodized to insulate said turns of wire at the pin, and the surface of the pin between said enlarged portions comprising a shoulder for engagement to provide for insertion of the pin into the recess without damage to said anodized surface.

12. In an electrical strain sensitive apparatus having spaced wire supporting means and a strain wire tensioned between them, at least one of said supporting means comprising a metallic base part provided with a recess and an aluminum pin having a first cylindrical portion driven into said recess for rigid connection with the base part, said pin having a second cylindrical portion of reduced diameter projecting from the outer end face of said first portion for supporting engagement by the strain wire, said pin having at least the surface thereof engaged by the wire anodized to electrically insulate the wire, and said pin having at the juncture of said first and second cylindrical portions a shoulder extending around the latter, said shoulder spacing said second portion laterally from said outer end face and thereby serving to protect the anodized surface of said second cylindrical portion from means engaged with said end face in driving the pin into said recess.

13. In an electrical strain sensitive apparatus having spaced wire supporting means and a strain wire tensioned between them, at least one of said supporting means comprising a metallic base part provided with a recess and an aluminum pin having a first portion driven into said recess for rigid connection with the base part, said pin having a second portion of reduced cross-sectional area projecting from the outer end face of said first portion for supporting engagement by the strain wire, said pin having at least the surface thereof engaged by the wire anodized to electrically insulate the wire, and said pin having at the juncture of said first and second portions a shoulder extending around the latter, said shoulder spacing said second portion laterally from said outer end face and thereby serving to protect the anodized surface of said second portion from means engaged with said end face in driving the pin into said recess.

14. In an electrical strain sensitive apparatus having spaced wire supporting means and a strain wire tensioned between them, at least one of said supporting means comprising a metallic base part provided with a recess and a metallic pin having a first portion driven into said recess for rigid connection with the base part, said pin having a second portion of reduced cross-sectional area projecting from the outer end face of said first portion for supporting engagement by the strain wire, the surface of said second portion of the pin being provided with insulation to electrically separate the wire from the pin, and said pin having at the juncture of said first and second portions a shoulder extending around the latter, said shoulder spacing said second portion laterally from said outer end face and thereby serving to protect the insulation on said second portion from means engaged with said end face in driving the pin into said recess.

LOUIS D. STATHAM.
CARLOS J. BAKER.
KARL D. SWARTZEL.

REFERENCES CITED

The following references are of record in the file of this patent:

UNITED STATES PATENTS

| Number | Name | Date |
|---|---|---|
| 1,117,240 | Presser | Nov. 17, 1914 |
| 2,036,458 | Carlson | Apr. 7, 1936 |